(12) United States Patent
Jornod et al.

(10) Patent No.: US 11,363,670 B2
(45) Date of Patent: Jun. 14, 2022

(54) METHODS, APPARATUSES AND COMPUTER PROGRAMS FOR TRANSPORTATION VEHICLES AND FOR A BASE STATION OF A MOBILE COMMUNICATION SYSTEM

(71) Applicant: VOLKSWAGEN AKTIENGESELLSCHAFT, Wolfsburg (DE)

(72) Inventors: Guillaume Jornod, Berlin (DE); Daniel Reimann, Braunschweig (DE)

(73) Assignee: Volkswagen Aktiengesellschaft

( * ) Notice: Subject to any disclaimer, the term of this patent is extended or adjusted under 35 U.S.C. 154(b) by 0 days.

(21) Appl. No.: 16/831,360

(22) Filed: Mar. 26, 2020

(65) Prior Publication Data

US 2020/0314952 A1 Oct. 1, 2020

(30) Foreign Application Priority Data

Mar. 28, 2019 (EP) ..................................... 19165900

(51) Int. Cl.
*H04W 76/40* (2018.01)
*H04W 76/11* (2018.01)
(Continued)

(52) U.S. Cl.
CPC .............. *H04W 76/40* (2018.02); *G08G 1/22* (2013.01); *H04W 4/08* (2013.01); *H04W 4/40* (2018.02); *H04W 76/11* (2018.02)

(58) Field of Classification Search
CPC ....... H04W 76/40; H04W 76/11; H04W 4/40; H04W 4/08; G08G 1/22
See application file for complete search history.

(56) References Cited

U.S. PATENT DOCUMENTS 8,718,908 B2   5/2014  Kumabe
10,440,668 B1* 10/2019 Wu ........................ H04W 4/46
(Continued)

FOREIGN PATENT DOCUMENTS

CN   105812132 A    7/2016
CN   107347030 A   11/2017
(Continued)

OTHER PUBLICATIONS

Nardini et al.; Cellular-V2X Communications for Platooning: Design and Evaluation; Sensors; 2018; vol. 18.
(Continued)

*Primary Examiner* — Ajay Cattungal
(74) *Attorney, Agent, or Firm* — Barnes & Thornburg, LLP

(57) ABSTRACT

Methods, apparatuses and computer programs for transportation vehicles and for a base station of a mobile communication system. A first method for a transportation vehicle of a platoon of transportation vehicles includes receiving a platoon identifier for the platoon of transportation vehicles from a base station of a mobile communication system, providing the platoon identifier to other transportation vehicles of the platoon of transportation vehicles via a side-link communication of the mobile communication system, and using the platoon identifier to communicate with the other transportation vehicles of the platoon of transportation vehicles via the mobile communication system.

21 Claims, 6 Drawing Sheets

(51) Int. Cl.
*H04W 4/40* (2018.01)
*G08G 1/00* (2006.01)
*H04W 4/08* (2009.01)

(56) References Cited

U.S. PATENT DOCUMENTS

| | | |
|---|---|---|
| 2013/0029591 A1 | 1/2013 | Park et al. |
| 2016/0295624 A1 | 10/2016 | Novlan et al. |
| 2017/0289864 A1 | 10/2017 | Narasimha et al. |
| 2018/0279096 A1 | 9/2018 | Wu et al. |
| 2019/0141487 A1* | 5/2019 | Jiang ................ H04W 72/0406 |
| 2019/0349719 A1* | 11/2019 | Pattan ..................... H04W 4/08 |
| 2020/0064140 A1* | 2/2020 | Tarkiainen ................ G08G 1/22 |
| 2020/0221540 A1* | 7/2020 | Sun ..................... H04W 68/005 |
| 2020/0402408 A1* | 12/2020 | Kobayashi ........... G06Q 50/265 |
| 2021/0125501 A1* | 4/2021 | Zhao ..................... G08G 1/162 |
| 2021/0219116 A1* | 7/2021 | Perras ..................... H04W 4/08 |
| 2021/0219309 A1* | 7/2021 | Roth-Mandutz .... H04L 61/2069 |

FOREIGN PATENT DOCUMENTS

| | | |
|---|---|---|
| CN | 108898824 A | 11/2018 |
| EP | 2562940 A2 | 2/2013 |
| EP | 3518603 A1 | 7/2019 |
| WO | 2012014040 A1 | 2/2012 |
| WO | 2017157474 A1 | 9/2017 |
| WO | 2018106774 A1 | 6/2018 |
| WO | 2018182728 A1 | 10/2018 |

OTHER PUBLICATIONS

Office Action for Chinese Patent Application No. 202010235727.3; dated Jun. 28, 2021.

* cited by examiner

METHODS, APPARATUSES AND COMPUTER PROGRAMS FOR TRANSPORTATION VEHICLES AND FOR A BASE STATION OF A MOBILE COMMUNICATION SYSTEM

PRIORITY CLAIM

This patent application claims priority to European Patent Application No. 19165900.2, filed 28 Mar. 2019, the disclosure of which is incorporated herein by reference in its entirety.

SUMMARY

Illustrative embodiments relate to methods, apparatuses and computer programs for transportation vehicles and for a base station of a mobile communication system, more particularly, but not exclusively, to a method, apparatus and computer program for a transportation vehicle of a platoon of transportation vehicles, to a method, apparatus and computer program for a transportation vehicle, and to a method, apparatus and computer program for a base station of a mobile communication system.

BRIEF DESCRIPTION OF THE DRAWINGS

Disclosed embodiments will be described with reference to the accompanying figures, in which.

DETAILED DESCRIPTION

Figure 1A:
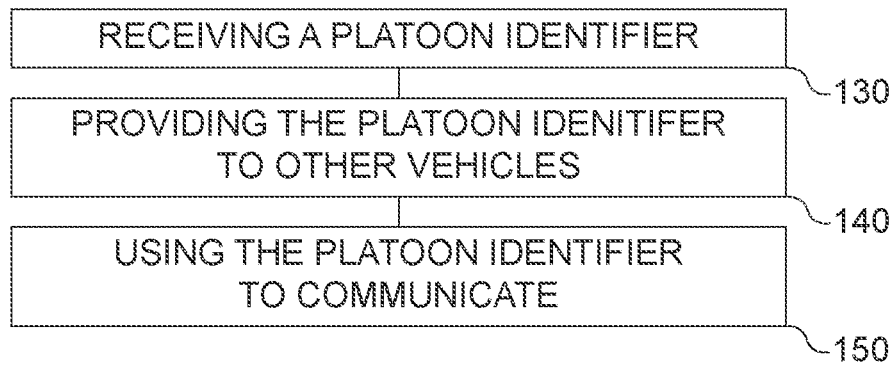
FIGS. 1a and 1b show flow charts of disclosed embodiments of a method for a transportation vehicle of a platoon of transportation vehicles.

The coordinated driving of a group of transportation vehicles (platooning) is a field of research and development. To coordinate the transportation vehicles, in many systems, direct vehicle-to-vehicle messages are used. Using such direct messages, a velocity and/or a direction of driving of the transportation vehicles of the group of transportation vehicles can be coordinated. Such direct messages are often based on a Vehicle-to-Vehicle (V2V), or more general, Vehicle-to-X (V2X) communication protocol. One of the wireless transmission standards backing V2X communication is based on IEEE (Institute of Electrical and Electronics Engineers) standard 802.11p. In some other cases, the communication within the platoon is coordinated via a cellular mobile communication system, either by transmitting the messages via a base station of the mobile communication system, or by using the base station of the mobile communication system to allocate wireless resources for a side-link communication between the transportation vehicles.

The article "Cellular-V2X Communications for Platooning: Design and Evaluation" by Nardini et al. describes some concepts for Inter-Platoon-Communication.

International patent application WO 2017/157474 A1 is directed to a wireless communication device for wireless communication in a wireless communication system, which comprises a base station and a plurality of wireless communication devices arranged in clusters. In the patent application, a unique cluster signature is assigned to each cluster and its wireless communication devices by a base station, and transmitted to the individual wireless communication devices by the base station.

European patent application EP 2 562 940 A2/US patent application US 2013/0029591 A1 relate to a method in which a base station clusters cooperative terminals so as to enable cooperative data transmission among the terminals.

There may be a desire for an improved inter- and intra-cluster communication.

Disclosed embodiments are based on the finding that a platoon identifier may be used for inter- and intra-cluster communication: Messages, that are to be transmitted to a cluster or within a cluster may be addressed to the cluster identifier instead of the transportation vehicles themselves, which may enable forwarding of the messages by any member of the platoon in case not all of the members of the platoon receive it. To increase the efficiency of such a scheme, disclosed embodiments may designate one transportation vehicle of the platoon, such as the platoon leader, the initiating transportation vehicle of the platoon, or a communication manager of the platoon (i.e., the platoon communication manager), to obtain the platoon identifier from a base station of the mobile communication system. The designated transportation vehicle may then distribute the platoon identifier to the other transportation vehicles of the platoon using side-link communication, so that the individual members of the platoon do not have to communicate with the base station, thus reducing an overhead. Furthermore, the platoon identifier is used to communicate within the platoon, e.g., by using the platoon identifier as a groupcast (i.e., multicast with a group destination identifier) destination identifier.

Disclosed embodiments provide a method for a transportation vehicle of a platoon of transportation vehicles. The method comprises receiving a platoon identifier for the platoon of transportation vehicles from a base station of a mobile communication system. The method further comprises providing the platoon identifier to other transportation vehicles of the platoon of transportation vehicles via a side-link communication of the mobile communication system. The method comprises using the platoon identifier to communicate with the other transportation vehicles of the platoon of transportation vehicles via the mobile communication system. This may enable an improved distribution of the platoon identifier, while providing efficient communication (e.g., based on a groupcast messaging scheme) within the platoon.

In some disclosed embodiments, the platoon identifier may be generated when the platoon is formed. The method may further comprise initializing the platoon of transportation vehicles. The method may further comprise requesting the platoon identifier for the platoon of transportation vehicles. The platoon identifier may be received from the base station of the mobile communication system in response to the request for the platoon identifier. The request for the platoon identifier may register the platoon at the mobile communication system (via the base station of the mobile communication system).

The platoon identifier for the platoon of transportation vehicles might be requested if the transportation vehicle is in coverage of a base station of the mobile communication system. A temporary identifier may be used for the platoon of transportation vehicles before the platoon identifier is received from the base station of the mobile communication system. This may enable the initialization of the platoon of transportation vehicles while the platoon is out of coverage of the mobile communication system (i.e., out of coverage of a base station of the mobile communication system).

In at least some disclosed embodiments, the platoon identifier may be used to address the other transportation vehicles of the platoon of transportation vehicle without using individual transportation vehicle identifiers. This may avoid having to include the individual transportation vehicle identifiers in the communication, which may in turn reduce the overhead.

For example, the platoon identifier may be used as a groupcast destination identifier. In groupcast communication, an identifier of a group of devices may be used as a destination address, instead of the individual destination addresses of the devices of the group of devices.

The platoon identifier may be used to communicate with the other transportation vehicles of the platoon of transportation vehicles via side-link communication of the mobile communication system and via a base station of the mobile communication system. This may enable both side-link communication and communication via the base station, e.g., if the platoon is so large that the increased reliability of the transmission via the base station merits the additional overhead.

In some disclosed embodiments, the method is executed by a communication manager of the platoon of transportation vehicles. This may avoid having a split responsibility in managing the communication of the platoon between the communication manager and a transportation vehicle executing the method.

Alternatively or additionally, the method may be executed by a transportation vehicle of the platoon of transportation vehicles that is in coverage of a base station of the mobile communication system during an initialization of the platoon of transportation vehicles. If, for example, during the initialization of the platoon, the platoon leader or the communication manager of the platoon is outside a coverage area of a base station of the mobile communication system, another transportation vehicle of the platoon of transportation vehicle may undertake the communication with the base station, so that the platoon identifier can be assigned to the platoon in a timely manner.

In some disclosed embodiments, the method comprises discarding the platoon identifier after the platoon of transportation vehicles has been out of coverage of the mobile communication system longer than a pre-defined time-interval. The method may comprise using a temporary platoon identifier after discarding the platoon identifier. In this scenario, the platoon identifier may be discarded, to avoid a situation in which the same platoon identifier has been re-assigned to another platoon, and in which the two platoons meet while out of coverage.

Disclosed embodiments further provide a method for a transportation vehicle. The method comprises joining a platoon of transportation vehicles. The method further comprises receiving a platoon identifier for the platoon of transportation vehicles from a transportation vehicle of the platoon of transportation vehicles via a side-link communication of a mobile communication system. The method further comprises using the platoon identifier to communicate with other transportation vehicles of the platoon of transportation vehicles via the mobile communication system. This may provide the transportation vehicle with a way of communicating with (all of) the members of the platoon.

Disclosed embodiments further provide a method for a base station of a mobile communication system. The method comprises receiving a request for a platoon identifier from a communication manager of a platoon of transportation vehicles via the mobile communication system. The method comprises determining the platoon identifier for the platoon of transportation vehicles. The method comprises providing the platoon identifier to a single transportation vehicle, i.e., the communication manager, of the platoon of transportation vehicles via the mobile communication system. This may enable an improved distribution of the platoon identifier among the transportation vehicles of the platoon.

Disclosed embodiments further provide a computer program having a program code for performing at least one of the methods, when the computer program is executed on a computer, a processor, or a programmable hardware component.

Disclosed embodiments further provide an apparatus for a transportation vehicle of a platoon of transportation vehicles. The apparatus comprises an interface for communicating via a mobile communication system. The apparatus comprises a control module configured to receive a platoon identifier for the platoon of transportation vehicles from a base station of the mobile communication system. The control module is configured to provide the platoon identifier to other transportation vehicles of the platoon of transportation vehicles via a side-link communication of the mobile communication system. The control module is configured to use the platoon identifier to communicate with the other transportation vehicles of the platoon of transportation vehicles via the mobile communication system.

Disclosed embodiments further provide an apparatus for a transportation vehicle. The apparatus comprises an interface for communicating via a mobile communication system. The apparatus comprises a control module configured to join a platoon of transportation vehicles. The control module is configured to receive a platoon identifier for the platoon of transportation vehicles from a transportation vehicle of the platoon of transportation vehicles via a side-link communication of a mobile communication system. The control module is configured to use the platoon identifier to communicate with other transportation vehicles of the platoon of transportation vehicles via the mobile communication system.

Disclosed embodiments further provide an apparatus for a base station of a mobile communication system. The apparatus comprises an interface for communicating via the mobile communication system. The apparatus comprises a control module configured to receive a request for a platoon identifier from a communication manager of a platoon of transportation vehicles via the mobile communication system. The control module is configured to determine the platoon identifier for the platoon of transportation vehicles. The control module is configured to provide the platoon identifier to a single transportation vehicle, i.e., the communication manager, of the platoon of transportation vehicles.

Various example embodiments will now be described more fully with reference to the accompanying drawings in which some example embodiments are illustrated. In the figures, the thicknesses of lines, layers or regions may be exaggerated for clarity. Optional components may be illustrated using broken, dashed or dotted lines.

Accordingly, while example embodiments are capable of various modifications and alternative forms, disclosed embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

As used herein, the term, "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted similarly.

The terminology used herein is for the purpose of describing particular disclosed embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, operations, elements or components, but do not preclude the presence or addition of one or more other features, integers, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1B:
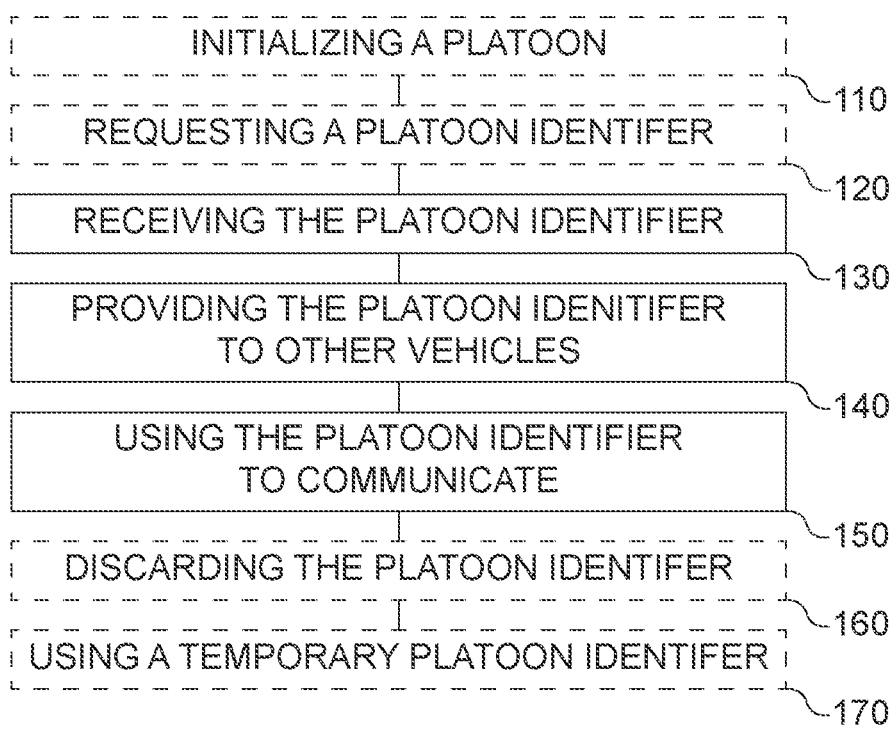

FIGS. 1a and 1b show flow charts of disclosed embodiments of a method for a transportation vehicle 100 of a platoon of transportation vehicles 1000. The method comprises receiving 130 a platoon identifier for the platoon of transportation vehicles 1000 from a base station 350 of a mobile communication system 300. The method further comprises providing 140 the platoon identifier to other transportation vehicles 200 of the platoon of transportation vehicles 1000 via a side-link communication of the mobile communication system 300. The method further comprises using 150 the platoon identifier to communicate with the other transportation vehicles 200 of the platoon of transportation vehicles 1000 via the mobile communication system 300. The method may be executed by the transportation vehicle 100 of the platoon of transportation vehicles.

Figure 1C:
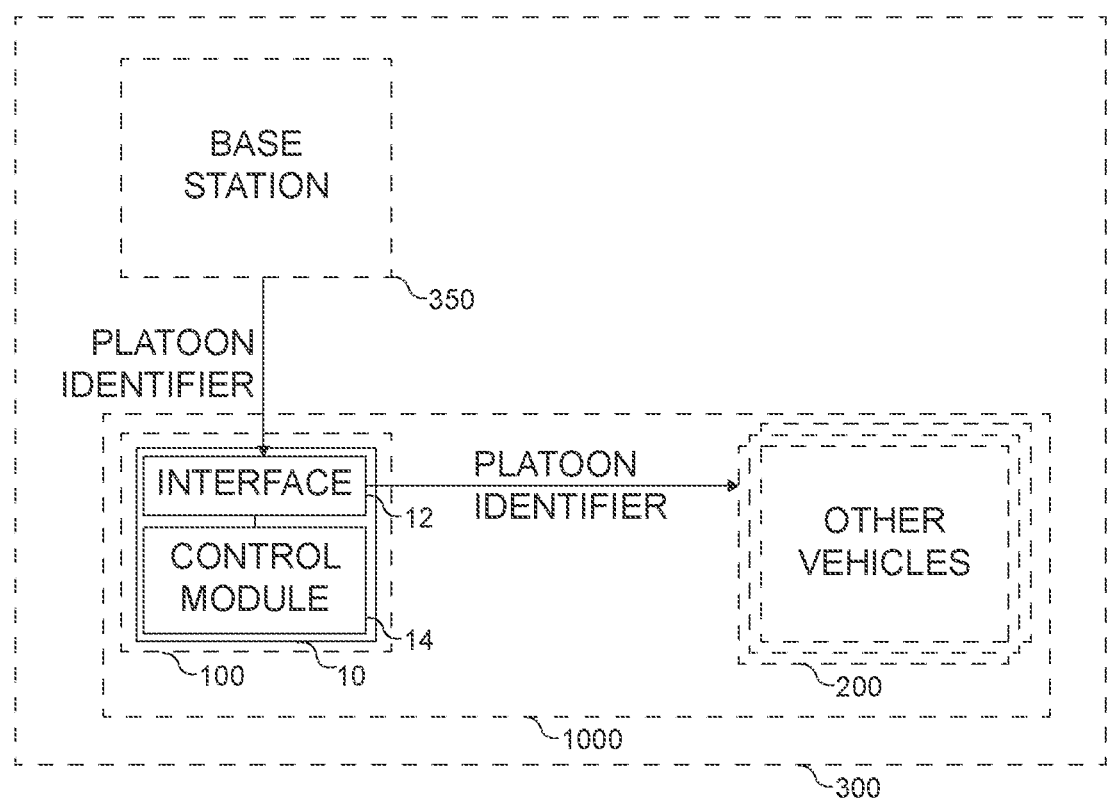
FIG. 1c shows a block diagram of an exemplary embodiment of an apparatus for a transportation vehicle of a platoon of transportation vehicles.

FIG. 1c shows a block diagram of an exemplary embodiment of a (corresponding) apparatus 10 for a transportation vehicle 100 of a platoon of transportation vehicles 1000. The apparatus 10 comprises an interface 12 for communicating via a mobile communication system 300. The apparatus 10 comprises a control module 14 that is coupled to the control module 14. The control module may be configured to execute the method introduced in connection with FIGS. 1a and/or 1b, e.g., in conjunction with the at least one interface 12. For example, the control module 14 is configured to receive a platoon identifier for the platoon of transportation vehicles 1000 from a base station 350 of the mobile communication system 300 (via the at least one interface 12). The control module 14 is configured to provide the platoon identifier to other transportation vehicles 200 of the platoon of transportation vehicles 1000 via a side-link communication of the mobile communication system 300. The control module 14 is configured to use the platoon identifier to communicate with the other transportation vehicles 200 of the platoon of transportation vehicles 1000 via the mobile communication system 300. FIG. 1c further shows the transportation vehicle 100 comprising the apparatus 10. FIG. 1c further shows the platoon of transportation vehicles 100 comprising the transportation vehicle 100 and the other transportation vehicles 200. FIG. 1c further shows a system comprising the base station 200 and the transportation vehicle 100, and optionally the other transportation vehicles 200.

The following description relates both to the method introduced in connection with FIGS. 1a and/or 1b and to the apparatus 10 introduced in connection with FIG. 1c.

At least some disclosed embodiments relate to a method for a transportation vehicle of a platoon of transportation vehicles. Grouping transportation vehicles into platoons is an approach for increasing the capacity of roads. Within a platoon, a group of transportation vehicles may be coordinated to accelerate or break simultaneously, allowing for smaller distances between the transportation vehicles. Among the transportation vehicles of the platoon, cellular vehicle-to-vehicle communication may be used to coordinate the platoon of transportation vehicles. A platoon of transportation vehicles may comprise a platoon leader, i.e., a transportation vehicle that determines and controls a velocity and heading of the platoon of transportation vehicles and that transmits and initiates an execution of driving instructions to be executed by transportation vehicles of the platoon of transportation vehicles. The platoon leader may lead the platoon of transportation vehicles. For example, the platoon leader may drive in front of the other transportation vehicles of the platoon of transportation vehicles. For example, if the platoon of transportation vehicles is to change lanes on the road or is to perform other driving maneuvers, these maneuvers are initiated by the platoon leader and transmitted to the other transportation vehicles of the platoon of transportation vehicles. In some disclosed embodiments, leadership in a platoon of transportation vehicles might not be bounded to an individual transportation vehicle. For example, the platoon of transportation vehicles might be coordinated by a central entity (e.g., a "cloud" entity) or the leading function may be distributed over a plurality of transportation vehicles. For example, the platoon may comprise a communication manager, i.e., a transportation vehicle that coordinates an inter-platoon communication and/or a communication with transportation vehicles or entities outside the platoon. In some cases, e.g., if the platoon of transportation vehicles is coordinated by a single transportation vehicle, the platoon leader may be the communication manager of the platoon. Alternatively, in a platoon with a distributed leading function, a transportation vehicle being the communication manager may be different from a transportation vehicle that initiates an execution of driving instructions to be executed by transportation vehicles of the platoon of transportation vehicles. For example, the transportation vehicle and/or the other transportation vehicles of the platoon of vehicles, e.g., transportation vehicles, trucks, lorries or motorcycles.

For example, the transportation vehicle of the platoon of transportation vehicles may be a platoon leader of the platoon of transportation vehicles, i.e., a transportation vehicle of the platoon of transportation vehicles that coordinates at least some facets of the platoon of transportation vehicles. In other words, the method may be executed by a platoon leader of the platoon of transportation vehicles 1000. Additionally or alternatively, the transportation vehicle of the platoon of transportation vehicles may be a communication manager of the platoon of transportation vehicles. For example, the method may be executed by any transportation vehicle of the platoon of transportation vehicles, e.g., based on a random assignment within the platoon of transportation vehicles, or based on whether the transportation vehicle is in coverage of the mobile communication system during an initialization of the platoon of transportation vehicles. For example, during the initialization of the platoon of transportation vehicles, the platoon may determine, which of the transportation vehicles of the platoon of transportation vehicles are in coverage of the mobile communication system, and one of the transportation vehicles that is in coverage of the mobile communication system may be designated to execute the method. In other words, the method may be executed by a transportation vehicle of the platoon of transportation vehicles 1000 that is in coverage of a base station 350 of the mobile communication system 300 during an initialization of the platoon of transportation vehicles 1000. This transportation vehicle may be or become the communication manager of the platoon of transportation vehicles 1000. In this context, a transportation vehicle being in coverage may correspond to the transportation vehicle being located within a coverage area of a (stationary) base station of the mobile communication system and registered and/or associated with the base station. A transportation vehicle being out of coverage of the mobile communication system may correspond to the transportation vehicle being located at a location that is not within a coverage area of a (i.e., any) base station of the mobile communication system.

The transportation vehicle executing the method may also perform (all of) the other communication with the base station of the mobile communication system. For example, after the platoon is initialized (i.e., formed), the method may comprise providing (i.e., transmitting) information related to a composition of the platoon to a base station of the mobile communication system. The information related to the composition of the platoon of transportation vehicles may comprise information related to a number of transportation vehicles that are part of the platoon and/or information related to identifiers of the transportation vehicles that are part of the platoon. Additionally or alternatively, the method may comprise providing information related to a change in a composition of the platoon of transportation vehicles to the base station. For example, the information related to a change in a composition of the platoon of transportation vehicles may be provided by the transportation vehicle executing the method, and not by the transportation vehicle being involved in the change of the composition of the platoon itself (i.e., a transportation vehicle that joins or leaves the transportation vehicle). The information related to the change in a composition of the platoon of transportation vehicles may comprise information related to a current number of transportation vehicles that are part of the platoon, information related to identifiers of the transportation vehicles that are part of the platoon, and/or information related to one or more transportation vehicles that have joined or have left the platoon of transportation vehicles since a previous update to the information related to the composition of the platoon of transportation vehicles.

For example, the transportation vehicle 100 may be a land transportation vehicle, a road transportation vehicle, a car, an off-road transportation vehicle, a transportation vehicle, a truck or a lorry. In at least some disclosed embodiments, the transportation vehicle 100 may be a transportation vehicle that is suitable for autonomous or semi-autonomous driving.

In at least some disclosed embodiments, the platoon identifier may be received (right) after initializing the platoon of transportation vehicles. The method may further comprise initializing 110 (i.e., forming) the platoon of transportation vehicles 1000. For example, if the method is executed by the platoon leader, the platoon of transportation vehicles may be initialized by the transportation vehicle that executes the method, i.e., the platoon leader. In this case, initializing the platoon of transportation vehicles may comprise coordinating the transportation vehicles of the platoon of transportation vehicles to form/initialize the platoon of transportation vehicles. If the method is executed by a different transportation vehicle, i.e., not by the leader of the platoon of transportation vehicles, such as the platoon communication manager, initializing the platoon of transportation vehicles may comprise being part of the initialization of the platoon of transportation vehicles, i.e., being one of the transportation vehicles that are a part of the platoon of transportation vehicles when the platoon if initialized/formed by the platoon leader. The method may further comprise requesting 120 the platoon identifier (e.g., based on the initialization of the platoon of transportation vehicle or after previous platoon identifier has been discarded). The requesting and receiving of the platoon identifier may be part of the initialization of the platoon of transportation vehicles. The platoon identifier may be received from the base station 350 of the mobile communication system 300 in response to the request for the platoon identifier. In this context, "receiving" data may correspond to obtaining the data via a transceiver of the transportation vehicle, e.g., by decoding a received transmission. Transmitting" data may correspond to providing the data to the transceiver of the transportation vehicle. The actual reception/transmission of the data may be performed by the transceiver of the transportation vehicle.

In at least some disclosed embodiments, the platoon identifier for the platoon of transportation vehicles 1000 may be requested if the transportation vehicle is in coverage of a base station 350 of the mobile communication system 300. For example, if the transportation vehicle is in coverage of the base station of the mobile communication system during or right after the initialization of the platoon, the platoon identifier for the platoon of transportation vehicles 1000 may be requested during or (right) after the initialization of the platoon. If not, a temporary identifier may be used in the meantime. In other words, a temporary identifier may be used for the platoon of transportation vehicles 1000 before the platoon identifier is received from the base station 350 of the mobile communication system 300.

The method comprises receiving 130 the platoon identifier (e.g., by receiving the platoon identifier with a transceiver of the transportation vehicle and obtaining the platoon identifier from the transceiver) for the platoon of transportation vehicles 1000 from the base station 350 of the mobile communication system 300.

In at last some disclosed embodiments, the platoon identifier may be suitable for identifying the platoon towards the mobile communication system and/or towards other transportation vehicles or other platoons. To achieve this, the platoon identifier may be unique, i.e., globally unique. The platoon identifier may be a (unique) binary sequence. The platoon identifier may be under control of the mobile communication system or under control of platooning coordination body. For example, the platoon identifier may be retrieved from a database by the base station 350, marked as used by the platoon of transportation vehicles, and provided to the transportation vehicle. At a given time, the platoon identifier may be specific (exclusively) to the platoon of transportation vehicles.

The platoon identifier is used 150 by the transportation vehicle to communicate with the other transportation vehicles of the platoon of transportation vehicles via the mobile communication system. For example, the platoon identifier may be used to address the other transportation vehicles of the platoon of transportation vehicle without using individual transportation vehicle identifiers. The platoon identifier might be used as the platoons address, not the individual transportation vehicle identifiers. For example, at least some disclosed embodiments are based on using groupcast, i.e., a multicast scheme, in which the identifier of a group is used as a common destination identifier (i.e., destination address) for (all of) the members of the group. In other words, in platooning, groupcast may be a multicast scheme, in which the identifier of a platoon is used as a common destination identifier for (all of) the transportation vehicles of the platoon. For example, the platoon identifier may be used as a groupcast destination identifier. The platoon identifier may be used to communicate with the other transportation vehicles of the platoon of transportation vehicles 1000 via side-link communication of the mobile communication system 300 and via a base station of the mobile communication system 300. In this context, side-link (or sidelink) communication may refer to a communication that is performed directly between two use equipment devices (e.g., two transportation vehicles) without traversing a base station of the mobile communication system (e.g., while allowing for a resource allocation or scheduling of a base station of the mobile communication system).

For example, the base station 350 of the mobile communication system may be an evolved Node B (eNodeB) or a gNodeB of the mobile communication system. Alternatively, a transportation vehicle may act as mobile base station of the mobile communication system, e.g., to provide a scheduling of side-link communication of the mobile communication system.

In general, the mobile communication system 300 may, for example, correspond to one of the Third Generation Partnership Project (3GPP)-standardized mobile communication networks, where the term mobile communication system is used synonymously to mobile communication network. The mobile or wireless communication system may correspond to, for example, a 5th Generation system (5G), a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Inter-operability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

In at least some disclosed embodiments, the mobile communication system 300 may be a vehicular communication system e.g., a vehicle-to-network (V2N) communication system. For example, the mobile communication system may be or may be based on a C-V2X (Cellular-Vehicle-to-Anything, which may comprise Long Term Evolution Vehicle-to-Anything, LTE-V2X, and 5th generation mobile communication system V2X, 5G-V2X) mobile communication system. The mobile communication system may support two communication modes: PC5, which is used between road users (e.g., on the sidelink), and Uu, which is used between road users and base stations. Using PC5 and Uu, the mobile communication system may support direct vehicle-to-vehicle communication (without involvement of a base station as a communication hop, using PC5, either managed by the base station or autonomously), vehicle-to-vehicle communication via a base station of the mobile communication system, and vehicle-to-network communication via a base station of the mobile communication system. The direct vehicle-to-vehicle communication may be based on the same radio resources (e.g., the same frequency resources) as the communication via the base station of the road user.

The method comprises providing 140 (i.e., transmitting via the transceiver of the transportation vehicle) the platoon identifier to the other transportation vehicles 200 of the platoon of transportation vehicles 1000 via the side-link communication of the mobile communication system 300. For example, the platoon identifier may be provided to the other transportation vehicles 200 using direct one-to-one (i.e., unicast) communication over the side-link of the mobile communication system, or using direct multicast communication over the side-link communication of the mobile communication system, e.g., using the individual transportation vehicle identifiers of the other transportation vehicles as destination identifiers in the multicast communication.

In some disclosed embodiments, as further shown in FIG. 1b, the method may comprise discarding 160 the platoon identifier after the platoon of transportation vehicles 1000 has been out of coverage of the mobile communication system longer than a pre-defined time-interval, e.g., after the platoon of transportation vehicles has been out of coverage of the mobile communication system more than 6 hours (or more than 12 hours, more than 24 hours). The method may comprise using 170 a temporary platoon identifier after discarding the platoon identifier. For example, the method may comprise generating the temporary platoon identifier, e.g., based on the previously used platoon identifier, based on a transportation vehicle identifier of the transportation vehicle executing the method, or based on the transportation vehicle identifiers of the transportation vehicles of the platoon of transportation vehicles.

The at least one interface 12 may correspond to one or more inputs and/or outputs for receiving and/or transmitting information, which may be in digital (bit) values according to a specified code, within a module, between modules or between modules of different entities. In some disclosed embodiments, the at least one interface 12 may comprise or may be coupled to a transceiver of the transportation vehicle 100. The transceiver may be implemented as any method or mechanism for transceiving, i.e., receiving and/or transmitting etc., one or more transceiver units, one or more transceiver devices and it may comprise typical receiver and/or transmitter components, such as one or more elements of the group of one or more Low-Noise Amplifiers (LNAs), one or more Power Amplifiers (PAs), one or more filters or filter circuitry, one or more diplexers, one or more duplexers, one or more Analog-to-Digital converters (A/D), one or more Digital-to-Analog converters (D/A), one or more modulators or demodulators, one or more mixers, one or more antennas, etc. The at least one interface may be configured to communicate via the mobile communication system via the transceiver. In other words, the transceiver may be configured to communicate via the mobile communication system 300.

In disclosed embodiments the control module 14 may be implemented using one or more processing units, one or more processing devices, any method or mechanism for processing, such as a processor, a computer or a programmable hardware component being operable with accordingly adapted software. In other words, the described function of the control module 14 may as well be implemented in software, which is then executed on one or more programmable hardware components. Such hardware components may comprise a general-purpose processor, a Digital Signal Processor (DSP), a micro-controller, etc.

More details of the method and/or apparatus 10 are mentioned in connection with the proposed concept or one or more examples described above or below (e.g., FIGS. 2a to 4b). The method and/or apparatus 10 may comprise one or more additional optional features corresponding to one or more facets of the proposed concept or one or more examples described above or below.

Figure 2A:
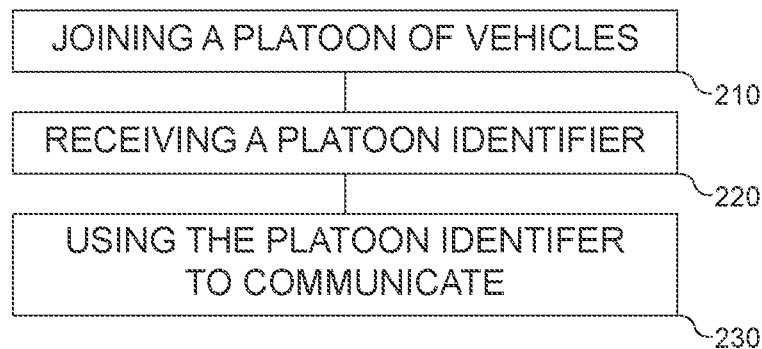
FIG. 2a shows a flow chart of an exemplary embodiment of a method for a transportation vehicle.

FIG. 2a shows a flow chart of an exemplary embodiment of a method for a transportation vehicle 200. The method comprises joining 210 a platoon of transportation vehicles 1000. The method further comprises receiving 220 a platoon identifier for the platoon of transportation vehicles 1000 from a transportation vehicle 100 of the platoon of transportation vehicles 1000 via a side-link communication of a mobile communication system 300. The method further comprises using 230 the platoon identifier to communicate with other transportation vehicles of the platoon of transportation vehicles 1000 via the mobile communication system 300. For example, the method may be executed by the transportation vehicle 200. The transportation vehicle 200 may be one of a plurality of transportation vehicles of the platoon of transportation vehicles 1000.

Figure 2B:
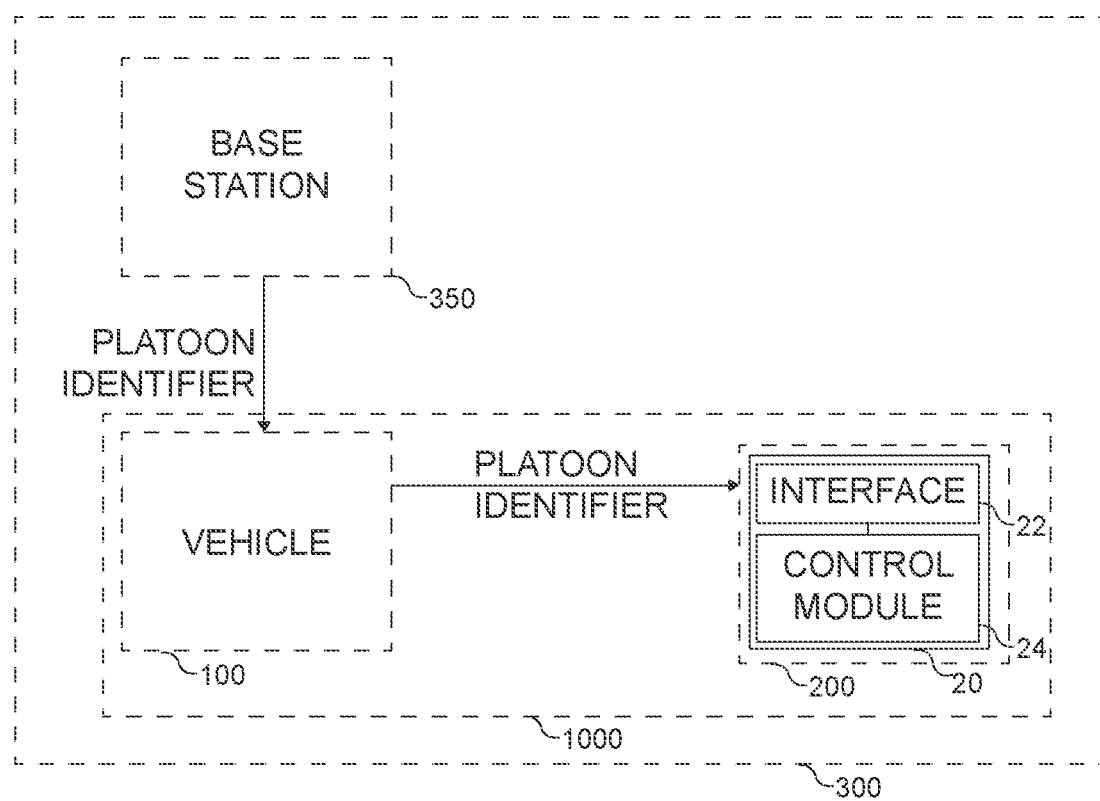
FIG. 2b shows a block diagram of an exemplary embodiment of an apparatus for a transportation vehicle.

FIG. 2b shows a block diagram of an exemplary embodiment of a (corresponding) apparatus 200 for a transportation vehicle 200. The apparatus 20 comprises an interface 22 for communicating via a mobile communication system 300. The apparatus 20 comprises a control module 24 that is coupled to the at least one interface 22. The control module may be configured to execute the method of FIG. 2a, e.g., in conjunction with the at least one interface 22. For example, the control module is configured to join a platoon of transportation vehicles 1000 (e.g., by communicating via the at least one interface 22). The control module is configured to receive a platoon identifier for the platoon of transportation vehicles 1000 from a transportation vehicle 100 of the platoon of transportation vehicles 1000 via a side-link communication of a mobile communication system 300 (e.g., via the at least one interface 22). The control module 24 is configured to use the platoon identifier to communicate with other transportation vehicles of the platoon of transportation vehicles 1000 via the mobile communication system 300. FIG. 2b further shows the transportation vehicle 200 comprising the apparatus 200. FIG. 2b further shows the platoon 1000 comprising the transportation vehicle 100 of the platoon of transportation vehicles and the transportation vehicle 200.

The following description relates to both the method of FIG. 2a and the apparatus 20 of FIG. 2b.

FIGS. 2a and 2b relate to a method and an apparatus for a transportation vehicle 200. For example, the transportation vehicle 200 may be one of the "other transportation vehicles of the platoon 1000" introduced in connection with FIGS. 1a to 1c. The transportation vehicle 200 joins the platoon, either when the platoon is formed, or at a later stage, and instead of receiving the platoon identifier from the base station 350, it receives the platoon identifier from the transportation vehicle 100, which may be the platoon leader and/or the communication manager of the platoon of transportation vehicles 1000.

The method comprises joining 210 the platoon of transportation vehicles 1000. For example, the method may comprise communicating with the transportation vehicle 100 of the platoon of transportation vehicles 1000 (e.g., with the platoon leader) to join the platoon of transportation vehicles. For example, the transportation vehicle 200 may join the platoon when the platoon is formed, i.e., during the initialization of the platoon of transportation vehicles 1000, or the transportation vehicle 200 may join the platoon at a later stage, i.e., after the initialization (forming) of the platoon of transportation vehicles.

The method comprises receiving 220 the platoon identifier for the platoon of transportation vehicles 1000 from the transportation vehicle 100 of the platoon of transportation vehicles 1000 via the side-link communication of a mobile communication system 300. For example, the reception of the platoon identifier may comprise receiving the platoon identifier using a transceiver of the transportation vehicle 200, and obtaining the platoon identifier from the transceiver of the transportation vehicle 200.

The method further comprises using 230 the platoon identifier to communicate with other transportation vehicles of the platoon of transportation vehicles 1000 via the mobile communication system 300. The platoon identifier may be used to communicate as previously shown in connection with FIGS. 1a to 1c.

The at least one interface 22 may correspond to one or more inputs and/or outputs for receiving and/or transmitting information, which may be in digital (bit) values according to a specified code, within a module, between modules or between modules of different entities. In some disclosed embodiments, the at least one interface 22 may comprise or may be coupled to a transceiver of the transportation vehicle 200. The transceiver may be implemented as any method or mechanism for transceiving, i.e., receiving and/or transmitting etc., one or more transceiver units, one or more transceiver devices and it may comprise typical receiver and/or transmitter components, such as one or more elements of the group of one or more Low-Noise Amplifiers (LNAs), one or more Power Amplifiers (PAs), one or more filters or filter circuitry, one or more diplexers, one or more duplexers, one or more Analog-to-Digital converters (A/D), one or more Digital-to-Analog converters (D/A), one or more modulators or demodulators, one or more mixers, one or more antennas, etc. The at least one interface may be configured to communicate via the mobile communication system via the transceiver. In other words, the transceiver may be configured to communicate via the mobile communication system 300.

In disclosed embodiments the control module 24 may be implemented using one or more processing units, one or more processing devices, any method or mechanism for processing, such as a processor, a computer or a programmable hardware component being operable with accordingly adapted software. In other words, the described function of the control module 24 may as well be implemented in software, which is then executed on one or more programmable hardware components. Such hardware components may comprise a general-purpose processor, a Digital Signal Processor (DSP), a micro-controller, etc.

More details of the method and/or apparatus 20 are mentioned in connection with the proposed concept or one or more examples described above or below (e.g., FIG. 1*a* to 1*c*, FIGS. 3*a* to 4*b*). The method and/or apparatus 20 may comprise one or more additional optional features corresponding to one or more facets of the proposed concept or one or more examples described above or below.

Figure 3A:
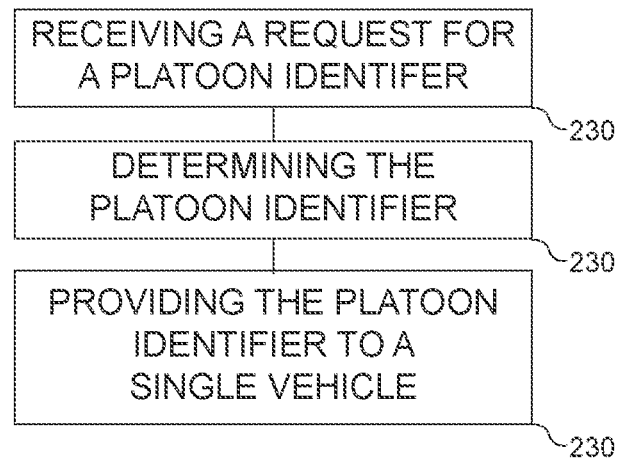
FIG. 3a shows a flow chart of an exemplary embodiment of a method for a base station of a mobile communication system.

FIG. 3*a* shows a flow chart of an exemplary embodiment of a method for a base station 350 of a mobile communication system 300. The method comprises receiving 310 a request for a platoon identifier from a communication manager 100 of a platoon of transportation vehicles 1000 via the mobile communication system 300. The method comprises determining 320 the platoon identifier for the platoon of transportation vehicles 1000. The method further comprises providing 330 the platoon identifier to the communication manager 100 of the platoon of transportation vehicles 1000 via the mobile communication system 300. The method may be executed by the base station 350 of the mobile communication system. Alternatively, the method may be executed by another (stationary) entity of the mobile communication system or by an entity of a platooning coordination body.

Figure 3B:
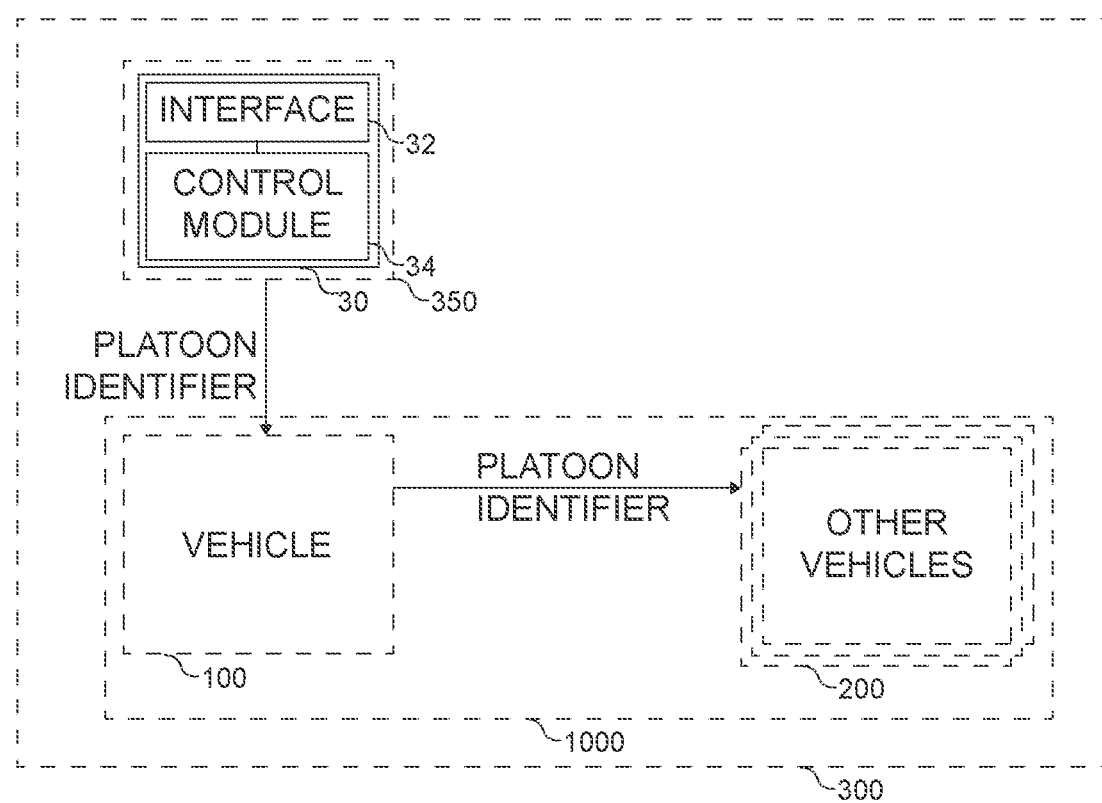
FIG. 3b shows a block diagram of an exemplary embodiment of an apparatus for a base station of a mobile communication system.

FIG. 3*b* show a block diagram of an exemplary embodiment of a (corresponding) apparatus 30 for a base station 350 of a mobile communication system 300. The apparatus 30 comprises an interface 32 for communicating via the mobile communication system 300. The apparatus 30 further comprises a control module 34 that is coupled to the at least one interface 32. The control module 34 may be configured to execute the method introduced in connection with FIG. 3*a*, e.g., in conjunction with the at least one interface 32. For example, the control module 34 is configured to receive a request for a platoon identifier from a communication manager 100 of a platoon of transportation vehicles 1000 via the mobile communication system 300 (e.g., via the at least one interface 32). The control module 34 is configured to determine the platoon identifier for the platoon of transportation vehicles 1000. The control module 34 is configured to provide the platoon identifier to the communication manager of the platoon of transportation vehicles 1000. FIG. 3*b* further shows the base station 350 comprising the apparatus 30. FIG. 3*b* further shows a system comprising the base station 350 and the transportation vehicle 100.

The following description relates both to the method of FIG. 3*a* and to the apparatus 30 of FIG. 3*b*.

At least some disclosed embodiments are directed at the base station 350 of the mobile communication system 300. In disclosed embodiments, the base station 350 is used to provide the platoon identifier to a transportation vehicle of the platoon, which in turn distributes the platoon identifier to the other members of the platoon. In some disclosed embodiments, the platoon identifier may be generated by the base station 350, e.g., based on an address space that is specific to the base station. In some other disclosed embodiments, the platoon identifier may be obtained from a (central) database. The (central) database may then be provided with information related to the members of the platoon of transportation vehicles.

The method comprises receiving 310 a request (e.g., receiving the request using a transceiver of the base station, and obtaining the request from the transceiver) for a platoon identifier from the communication manager 100 of a platoon of transportation vehicles 1000 via the mobile communication system 300. The method further comprises determining 320 the platoon identifier for the platoon of transportation vehicles 1000. For example, the determining of the platoon identifier may comprise generating the platoon identifier based on an address space that is specific to the base station. Alternatively, the determining of the platoon identifier may comprise obtaining the platoon identifier from a database, e.g., from a central database of a platooning coordination body.

The method further comprises providing 330 the platoon identifier (e.g., providing the platoon identifier to a transceiver of the base station, and transmitting the platoon identifier using the transceiver of the base station) to a single transportation vehicle, the platoon communication manager, of the platoon of transportation vehicles 1000 via the mobile communication system 300. For example, the platoon identifier may (only) be provided to a single transportation vehicle of the platoon of transportation vehicles 1000, e.g., to be distributed by the communication manager 100 to the other transportation vehicles of the platoon of transportation vehicles 1000.

In at least some disclosed embodiments, (all) communication that is related to a maintenance of the platoon of transportation vehicles may be between the base station 350 and the platoon communication manager 100. For example, after the platoon is initialized (i.e., formed), the method may comprise obtaining (i.e., receiving) information related to a composition of the platoon from the communication manager 100. The information related to the composition of the platoon of transportation vehicles may comprise information related to a number of transportation vehicles that are part of the platoon and/or information related to identifiers of the transportation vehicles that are part of the platoon. Additionally or alternatively, the method may comprise obtaining information related to a change in a composition of the platoon of transportation vehicles from the (same) platoon communication manager 100. For example, the information related to a change in a composition of the platoon of transportation vehicles may be provided by the platoon communication manager 100, and not by the transportation vehicle being involved in the change of the composition of the platoon itself (i.e., a transportation vehicle that joins or leaves the transportation vehicle). The information related to the change in a composition of the platoon of transportation vehicles may comprise information related to a current number of transportation vehicles that are part of the platoon, information related to identifiers of the transportation vehicles that are part of the platoon, and/or information related to one or more transportation vehicles that have joined or have left the platoon of transportation vehicles since a previous update to the information related to the composition of the platoon of transportation vehicles.

The at least one interface 32 may correspond to one or more inputs and/or outputs for receiving and/or transmitting information, which may be in digital (bit) values according to a specified code, within a module, between modules or between modules of different entities. In some disclosed embodiments, the at least one interface 32 may comprise or may be coupled to a transceiver of the base station 350. The transceiver may be implemented as any method or mechanism for transceiving, i.e., receiving and/or transmitting etc., one or more transceiver units, one or more transceiver devices and it may comprise typical receiver and/or transmitter components, such as one or more elements of the group of one or more Low-Noise Amplifiers (LNAs), one or more Power Amplifiers (PAs), one or more filters or filter circuitry, one or more diplexers, one or more duplexers, one or more Analog-to-Digital converters (A/D), one or more Digital-to-Analog converters (D/A), one or more modulators or demodulators, one or more mixers, one or more antennas, etc. The at least one interface may be configured to communicate via the mobile communication system via the transceiver. In other words, the transceiver may be configured to communicate via the mobile communication system 300.

In disclosed embodiments the control module 34 may be implemented using one or more processing units, one or more processing devices, any method or mechanism for processing, such as a processor, a computer or a programmable hardware component being operable with accordingly adapted software. In other words, the described function of the control module 34 may as well be implemented in software, which is then executed on one or more programmable hardware components. Such hardware components may comprise a general-purpose processor, a Digital Signal Processor (DSP), a micro-controller, etc.

More details of the method and/or apparatus 30 are mentioned in connection with the proposed concept or one or more examples described above or below (e.g., FIG. 1a to 2b, FIGS. 4a to 4b). The method and/or apparatus 30 may comprise one or more additional optional features corresponding to one or more facets of the proposed concept or one or more examples described above or below.

Figure 4A:
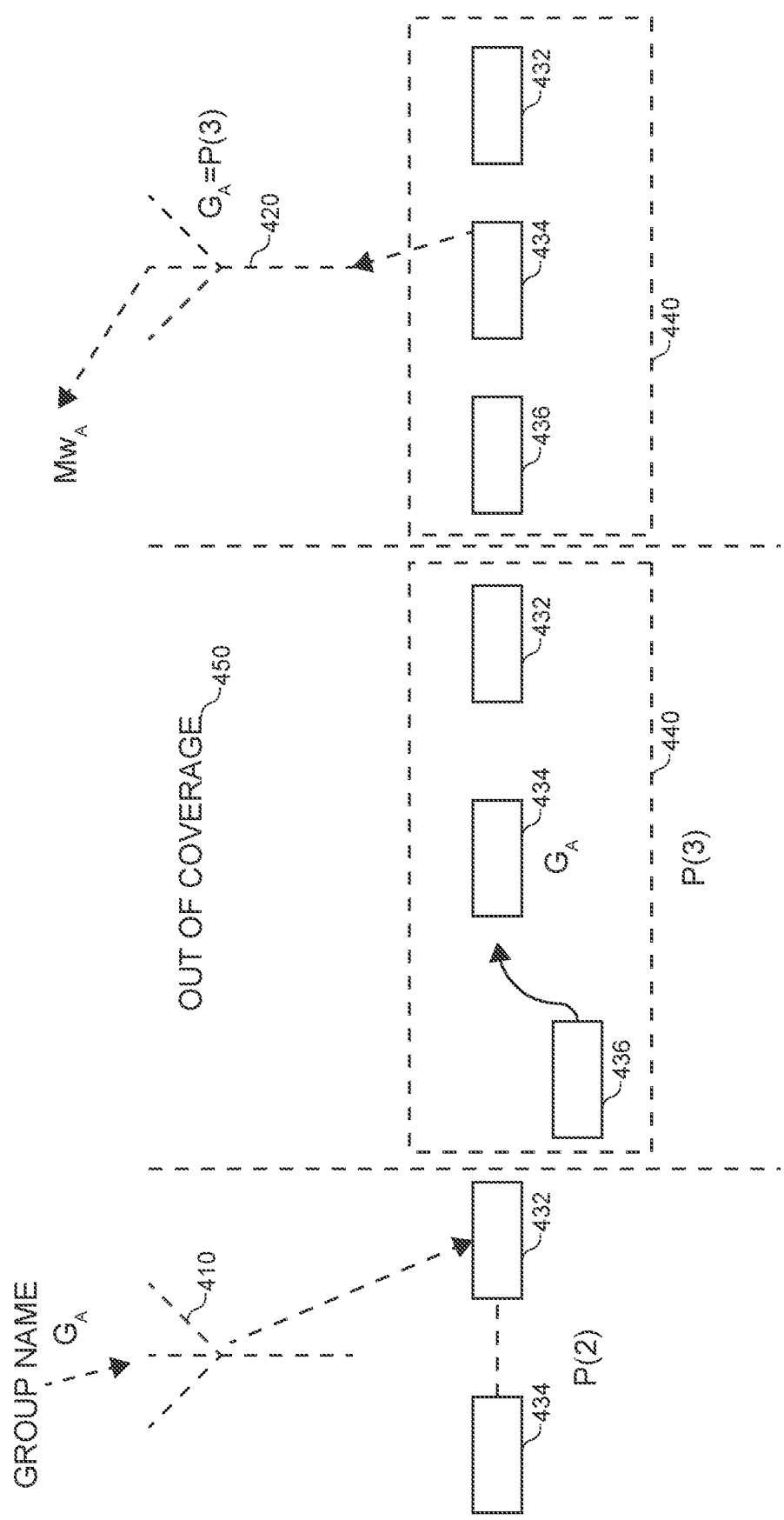
FIGS. 4a and 4b show schematic diagrams of platoons that are either in coverage or out of coverage of a mobile communication system.
Figure 4B:
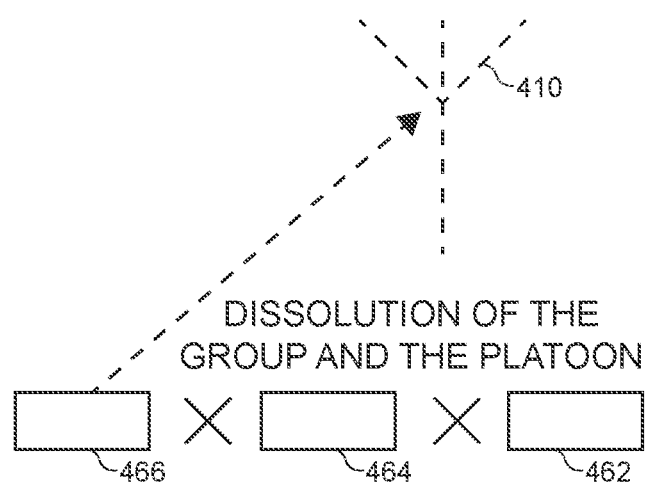

FIGS. 4a and 4b show schematic diagrams of platoons that are either in coverage or out of coverage of a mobile communication system. In FIG. 4a, a platoon of size P(2) is formed by transportation vehicles 432 and 432 while in coverage of a first base station 410 (e.g., the base station of the mobile communication system as introduced in connection with FIGS. 1a to 3b). The group name (i.e., the platoon identifier) is obtained by the base station 410 and provided to the transportation vehicle 432 (e.g., the transportation vehicle 100 as introduced in connection with FIGS. 1a to 3b). Subsequently, the platoon leaves the coverage of the base station 410, entering an out of coverage region 450. In the out of coverage region 450, a further transportation vehicle 436 joins the platoon 440, and receives the platoon identifier from one of the previous transportation vehicles 432 of the platoon, so the platoon is now a platoon of size P(3). Once the platoon is in coverage of a further base station 420 of the mobile communication system, transportation vehicle 434 provides information related to the changed composition of the platoon 440 to the base station 420, which may forward the information to a central database.

In FIG. 4b, the base station 410 is contacted by a single transportation vehicle 466 of a platoon/group of transportation vehicles 462, 464, 466 that is dissolving. Transportation vehicle 466 provides the base station with the information that the platoon is dissolving. In such a scenario, the other transportation vehicles 462, 464 might not communicate with the base station 410.

More details of disclosed embodiments are mentioned in connection with the proposed concept or one or more examples described above (e.g., FIG. 1a to 3b). Disclosed embodiments may comprise one or more additional optional features corresponding to one or more facets of the proposed concept or one or more examples described above or below.

As already mentioned, in disclosed embodiments the respective methods may be implemented as computer programs or codes, which can be executed on a respective hardware. Hence, another disclosed embodiment is a computer program having a program code for performing at least one of the above methods, when the computer program is executed on a computer, a processor, or a programmable hardware component. A further disclosed embodiment is a computer readable storage medium storing instructions which, when executed by a computer, processor, or programmable hardware component, cause the computer to implement one of the methods described herein.

A person of skill in the art would readily recognize that operations of various above-described methods can be performed by programmed computers, for example, positions of slots may be determined or calculated. Herein, some disclosed embodiments are also intended to cover program storage devices, e.g., digital data storage media, which are machine or computer readable and encode machine-executable or computer-executable programs of instructions where the instructions perform some or all of the operations of methods described herein. The program storage devices may be, e.g., digital memories, magnetic storage media such as magnetic disks and magnetic tapes, hard drives, or optically readable digital data storage media. The disclosed embodiments are also intended to cover computers programmed to perform the operations of methods described herein or (field) programmable logic arrays ((F)PLAs) or (field) programmable gate arrays ((F)PGAs), programmed to perform the operations of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed to furthering the art, and are to be construed as being without limitation to such specifically recited examples and conditions. Moreover, all statements herein reciting principles and disclosed embodiments of the disclosure, as well as specific examples thereof, are intended to encompass equivalents thereof.

When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, Digital Signal Processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate disclosed embodiment. While each claim may stand on its own as a separate disclosed embodiment, it is to be noted that—although a dependent claim may refer in the claims to a specific combination with one or more other claims—other disclosed embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having methods or mechanisms for performing each of the respective operations of these methods.

LIST OF REFERENCE SIGNS

10 Apparatus
12 Interface
14 Control module
20 Apparatus
22 Interface
24 Control module
30 Apparatus
32 Interface
34 Control module
100 Transportation vehicle
110 Initializing a platoon
120 Requesting a platoon identifier
130 Receiving the platoon identifier
140 Providing the platoon identifier to other transportation vehicles of the platoon
150 Using the platoon identifier to communicate
200 Transportation vehicle
210 Joining a platoon of transportation vehicles
220 Receiving a platoon identifier
230 Using the platoon identifier to communicate
300 Mobile communication system
310 Receiving a request for a platoon identifier
320 Determining the platoon identifier
330 Providing the platoon identifier
350 Base station
410, 420 Base station
432, 434, 436 Transportation vehicles
440 Platoon
450 Out of coverage region

The invention claimed is:

1. An apparatus for a transportation vehicle of a platoon of transportation vehicles, the apparatus comprising:
an interface for communicating via a mobile communication system; and
a control module to:
receive a platoon identifier for the platoon of transportation vehicles from a base station of the mobile communication system,
provide the platoon identifier to other transportation vehicles of the platoon of transportation vehicles via a side-link communication of the mobile communication system, and
use the platoon identifier to communicate with the other transportation vehicles of the platoon of transportation vehicles via the mobile communication system,
wherein the platoon identifier communicates with the other transportation vehicles of the platoon of transportation vehicles via side-link communication of the mobile communication system and via a base station of the mobile communication system, and
wherein the control module discards the platoon identifier in response to the platoon of transportation vehicles being out of coverage of the mobile communication system longer than a pre-defined time-interval, and uses a temporary platoon identifier after discarding the platoon identifier.

2. A non-transitory computer readable medium including a program code that enable the control module of claim 1 to operate when the computer program is executed on a computer, a processor, or a programmable hardware component.

3. The apparatus of claim 1, wherein the control module to:
initialize the platoon of transportation vehicles; and
request the platoon identifier for the platoon of transportation vehicles, wherein the platoon identifier is received from the base station of the mobile communication system in response to the request for the platoon identifier.

4. The apparatus of claim 3, wherein the platoon identifier for the platoon of transportation vehicles is requested in response to the transportation vehicle being in coverage of a base station of the mobile communication system, and/or wherein a temporary identifier is used for the platoon of transportation vehicles before the platoon identifier is received from the base station of the mobile communication system.

5. The apparatus of claim 1, wherein the platoon identifier is used to address the other transportation vehicles of the platoon of transportation vehicle without using individual transportation vehicle identifiers.

6. The apparatus of claim 1, wherein the platoon identifier is used as a groupcast destination identifier.

7. The apparatus of claim 1, wherein operations are executed by a communication manager of the platoon of transportation vehicles.

8. The apparatus of claim 1, wherein operations are executed by a transportation vehicle of the platoon of transportation vehicles that is in coverage of a base station of the mobile communication system during an initialization of the platoon of transportation vehicles.

9. An apparatus for a transportation vehicle, the apparatus comprising:
an interface for communicating via a mobile communication system; and
a control module configured to:
join a platoon of transportation vehicles,
receive a platoon identifier for the platoon of transportation vehicles from a transportation vehicle of the platoon of transportation vehicles via a side-link communication of a mobile communication system, and use the platoon identifier to communicate with other transportation vehicles of the platoon of transportation vehicles via the mobile communication system, wherein the platoon identifier communicates with the other transportation vehicles of the platoon of transportation vehicles via side-link communication of the mobile communication system and via a base station of the mobile communication system, wherein the control module discards the platoon identifier in response to the platoon of transportation vehicles being out of coverage of the mobile communication system longer than a pre-defined time-interval, and uses a temporary platoon identifier after discarding the platoon identifier.

10. A non-transitory computer readable medium including a program code that enable the control module of claim 9 to operate when the computer program is executed on a computer, a processor, or a programmable hardware component.

11. An apparatus for a base station of a mobile communication system, the apparatus comprising:
an interface for communicating via the mobile communication system; and
a control module configured to:
receive a request for a platoon identifier from a communication manager of a platoon of transportation vehicles via the mobile communication system, wherein the communication manager is a transportation vehicle in the platoon of transportation vehicles,
determine the platoon identifier for the platoon of transportation vehicles, and
provide the platoon identifier only to the communication manager of the platoon of transportation vehicles,
wherein the platoon identifier is used at least by the communication manager to communicate with the other transportation vehicles of the platoon of transportation vehicles via side-link communication of the mobile communication system and via the base station of the mobile communication system, and
wherein the control module communicates only with the communication manager of the platoon of transportation vehicles regarding all maintenance of the platoon of transportation vehicles.

12. A non-transitory computer readable medium including a program code that enable the control module of claim 11 to operate when the computer program is executed on a computer, a processor, or a programmable hardware component.

13. A method for a transportation vehicle of a platoon of transportation vehicles, the method comprising:
receiving a platoon identifier for the platoon of transportation vehicles from a base station of a mobile communication system;
providing the platoon identifier to other transportation vehicles of the platoon of transportation vehicles via a side-link communication of the mobile communication system; and
using the platoon identifier to communicate with the other transportation vehicles of the platoon of transportation vehicles via the mobile communication system,
discarding the platoon identifier in response to the platoon of transportation vehicles being out of coverage of the mobile communication system longer than a pre-defined time interval, and
using a temporary platoon identifier after discarding the platoon identifier,
wherein the platoon identifier communicates with the other transportation vehicles of the platoon of transportation vehicles via side-link communication of the mobile communication system and via a base station of the mobile communication system.

14. The method of claim 13, further comprising:
initializing the platoon of transportation vehicles; and
requesting the platoon identifier for the platoon of transportation vehicles, wherein the platoon identifier is received from the base station of the mobile communication system in response to the request for the platoon identifier.

15. The method of claim 14, wherein the platoon identifier for the platoon of transportation vehicles is requested in response to the transportation vehicle being in coverage of a base station of the mobile communication system, and/or
wherein a temporary identifier is used for the platoon of transportation vehicles before the platoon identifier is received from the base station of the mobile communication system.

16. The method of claim 13, wherein the platoon identifier is used to address the other transportation vehicles of the platoon of transportation vehicle without using individual transportation vehicle identifiers.

17. The method of claim 13, wherein the platoon identifier is used as a groupcast destination identifier.

18. The method of claim 13, wherein the method is executed by a communication manager of the platoon of transportation vehicles.

19. The method of claim 13, wherein the method is executed by a transportation vehicle of the platoon of transportation vehicles that is in coverage of a base station of the mobile communication system during an initialization of the platoon of transportation vehicles.

20. A method for a transportation vehicle, the method comprising:
joining a platoon of transportation vehicles;
receiving a platoon identifier for the platoon of transportation vehicles from a transportation vehicle of the platoon of transportation vehicles via a side-link communication of a mobile communication system;
using the platoon identifier to communicate with other transportation vehicles of the platoon of transportation vehicles via the mobile communication system,
discarding the platoon identifier in response to the platoon of transportation vehicles being out of coverage of the mobile communication system longer than a pre-defined time interval, and
using a temporary platoon identifier after discarding the platoon identifier,
wherein the platoon identifier communicates with the other transportation vehicles of the platoon of transportation vehicles via side-link communication of the mobile communication system and via a base station of the mobile communication system.

21. A method for a base station of a mobile communication system, the method comprising:
receiving a request for a platoon identifier from a communication manager of a platoon of transportation vehicles via the mobile communication system, wherein the communication manager is a transportation vehicle in the platoon of transportation vehicles;
determining the platoon identifier for the platoon of transportation vehicles; and
providing the platoon identifier only to the communication manager of the platoon of transportation vehicles via the mobile communication system,
wherein the platoon identifier is used at least by the communication manager to communicate with the other transportation vehicles of the platoon of transportation vehicles via side-link communication of the mobile communication system and via the base station of the mobile communication system.

\* \* \* \* \*